United States Patent [19]
Van Den Bergh

[11] Patent Number: 4,807,657
[45] Date of Patent: Feb. 28, 1989

[54] AUTOMATIC FLUID FLOW REGULATOR

[75] Inventor: Hugo H. Van Den Bergh, San Diego, Calif.

[73] Assignee: General Dynamics Corporation/Convair Div., San Diego, Calif.

[21] Appl. No.: 187,709

[22] Filed: Apr. 29, 1988

[51] Int. Cl.[4] ............................................. G05D 11/03
[52] U.S. Cl. .................................................... 137/101
[58] Field of Search .......................... 137/98, 101, 118

[56] References Cited

U.S. PATENT DOCUMENTS

| | | |
|---|---|---|
| 2,266,921 | 12/1941 | Trautman ............................ 137/101 |
| 2,643,664 | 6/1953 | Willett ................................. 137/101 |
| 3,370,602 | 2/1968 | Nelson ................................. 137/101 |
| 3,674,047 | 7/1972 | Tauger ................................. 137/101 |
| 3,924,650 | 12/1975 | Parquet ................................ 137/101 |

FOREIGN PATENT DOCUMENTS 45-12190 10/1965 Japan ..................................... 137/101

Primary Examiner—Robert G. Nilson
Attorney, Agent, or Firm—John R. Duncan; Frank D. Gilliam

[57] ABSTRACT

An automatic fluid flow regulator particularly adapted to maintain equilibrium within a cryogenic fluid system. The regulator includes a housing that has an input port and first and second output ports. A housing of the regulator contains a spool body having longitudinally extending expanding fluid channels provided on its outer periphery. The spool body cooperates with spaced flow restriction shoulders on which it is slidably disposed to bias the spool body by means of pressure differences exerted on the ends of the spool body by disturbances in the branches of the system to a position in which more fluid is supplied to one branch while less fluid is supplied to the other branch and the fluid system is brought into equilibrium.

10 Claims, 1 Drawing Sheet

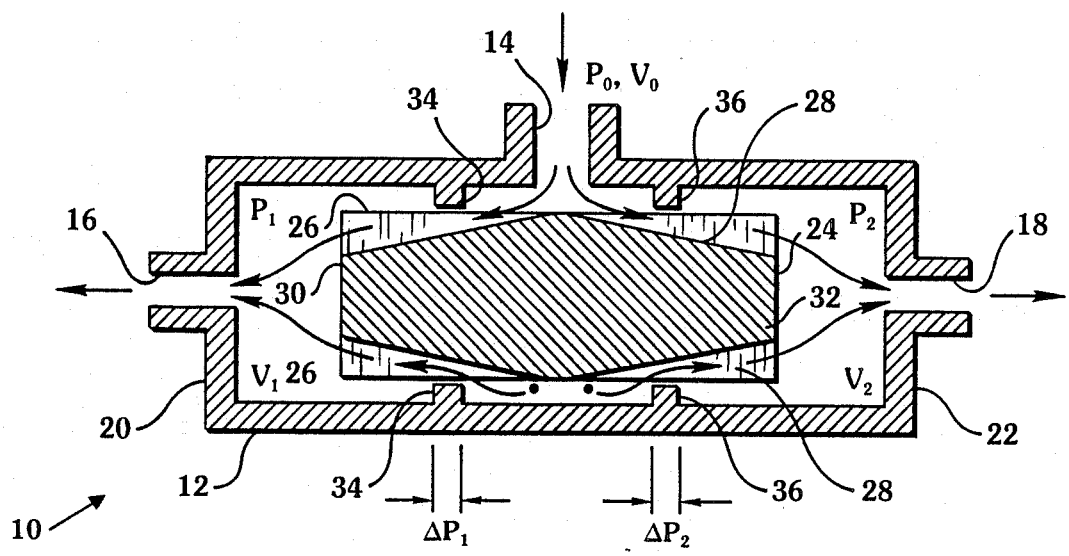

AUTOMATIC FLUID FLOW REGULATOR

BACKGROUND OF THE INVENTION

1. Field of the Invention

This invention relates generally to an improvement in the field of flow regulation devices and more particularly, but not by way of limitation to an automatic fluid flow regulator particularly adapted to split the flow of a fluid into two separate branches and to maintain the ratio of such flows in a predetermined ratio.

2. Brief Description of the Prior Art

In fluid distribution systems it is often necessary to split the flow of a fluid into two branches, with the ratio of the flow of fluid into the two branches being maintained in a predetermined ratio. In many instances this ratio may be kept constant by automatic regulating valves. However, in some applications, the use of such automatic valves with their associated sensors, springs, coils and the like are not practical, for example, in cryogenic fluid systems. The present invention will automatically adjust the flow of fluid in each branch of a fluid distribution system to maintain a constant predetermined ratio and at the same time avoid the use of sensors, springs or valves. It is especially difficult in cryogenic systems having two loops to confirm that both loops of the system are receiving sufficient coolant during cooldown. The automatic flow regulator of the present invention is intended to automatically ensure that both loops do indeed receive the proper amount of coolant.

The presently available fluid control means while perhaps successful in solving other problems do not appear to be capable of application to maintaining fluid flows in a predetermined ratio in a cryogenic system without recourse to various unacceptable mechanical elements such as valves, springs, or sensors. One example is the flow divider valve of U.S. Pat. No. 4,204,554 issued on May 27, 1980 to Alistair G. Taig. The Taig patent discloses a flow divider valve cooperating with a housing to control flow between an input port, a first output port, and a second output port. The valve comprises a double seat valve member centrally mounted within a valve body by means of an integral resilient diaphragm that enables the valve to preferentially direct fluid flow towards the output port presenting the higher back pressure. This arrangement is in contradistinction to the present invention which maintains equilibrium in two branches of a cryogenic system.

U.S. Pat. No. 3,924,650 issued to Donald J. Parquet on Dec. 9, 1975 for Fluid Flow Divider Valve discloses a valve having a hollow spool shiftable in a valve body to regulate fluid flow through two outlet openings. Compression springs are disposed at opposite ends of the spool for centering the spool relative to the valve body while a fluid by-pass passageway is provided in the spool for permitting fluid to pass to an outlet opening when the spool is shifted to an extreme position which would otherwise close off the outlet opening and thereby preclude an undesirable increase in upstream pressure when the spool has been shifted to diminish flow in one branch. The use of springs of the Parquet device would render it non-functional for use in a cryogenic environment.

U.S. Pat. No. 3,370,602 issued on Feb. 27, 1968 to Vaughn A. Nelson for an Automatic Flow Diverter Valve discloses a reciprocalably operable valve interposable between a source of fluid pressure and two hydraulic circuits wherein pressure demands in one of the circuits is effective to cause automatic shifting of the spool for directing a substantial portion of the fluid flow from the pressure source to the circuit creating the demand for said flow. This valve acts to divert even more fluid flow from one affected branch to the other. This action of this valve will reinforce the initial disturbance rather than counteract it. On the other hand, the automatic fluid flow regulator of the present invention will automatically adjust the flows in both branches to restore the previous ratio of volumetric flows in the two branches.

In Japanese Pub. No. 12/90/70, Class 66 A8Z, dated Oct. 30, 1965 by Shinmeiwa Kogyokik, there is disclosed a pressure compensation type proportional valve capable of varying flow rate at an optional rate. Means in the form of metering needle valves are provided to vary the flow from the input port to the two output orifices but this device provides no means to automatically equalize the pressures in two branches should there be a disturbance downstream in one of the branches since this device acts only on pressure changes at the input port of this device.

The inadequacies of previous flow regulation devices as applied to the maintenance of equilibrium in two branches of a cryogenic system has been illustrated and the automatic fluid flow regulator of the present invention is believed to have resolved these inadequacies for such an application.

SUMMARY OF THE INVENTION

The present invention contemplates an improved automatic fluid flow regulate that is particularly adapted to split the flow of a fluid, such as a cryogenic fluid, into two separate branches and to maintain the ratio of such flows in a predetermined ratio and which comprises a hollow regulator casing having an inlet port and first and second outlet ports. A spool body is slidably disposed within the casing and is provided with longitudinally extending fluid passages on it periphery that increase in size from the midpoint of the spool body to each of the opposing ends of the spool. First and second flow restriction means having a predetermined size and spacing slidably support the spool body within the casing so that when a flow disturbance occurs within one branch so as to cause the volumetric flow rate of one branch to be greater than the other then the pressure within the branch having the lesser volumetric flow will exert a pressure against an end of the spool body and cause it to slide within the casing and expose a greater portion of the adjacent fluid passage thereby permitting a greater fluid flow to that end of the spool body and to that particular branch until equilibrium is again reached for fluid flow through the regulator.

Other advantages of the invention will be evident from the following detailed description, when read in conjunction with the accompanying drawing which illustrates the invention.

BRIEF DESCRIPTION OF THE DRAWING

An embodiment of the invention will now be described by way of example only and with reference to the accompanying drawing which shows, diagrammatically, an automatic fluid flow regulator constructed in accordance with a preferred embodiment of the invention.

DESCRIPTION OF A PREFERRED EMBODIMENT

Referring now to the drawing in detail, reference character 10 generally designates one embodiment of an automatic fluid flow regulator particularly adapted to split the flow of a fluid into two separate branches and to maintain the ratio of such flows in a predetermined ratio. The automatic fluid flow regulator 10 includes a hollow regulator casing 12 having an inlet port 14 that is connected to a source of fluid (not shown), such as a cryogenic fluid, and first and second outlet ports 16 and 18 that are disposed in opposing ends 20 and 22 of casing 12. It is to be understood that the first and second outlet ports 16 and 18 are connected to separate branches (not shown) of a suitable fluid system, such as a cryogenic system. The shape of the housing 12 may be annular or angular, depending on the particular fabrication of the fluid regulator 10.

A suitable spool valve body 24 that is preferably solid in construction is slidably disposed within the casing 12 in a manner that will be disclosed in more detail hereinafter. The spool valve body 24 is provided with first and second plurality of longitudinally extending grooves or fluid passages 26 and 28, that commence generally at the midpoint of the valve body 24 and increase in size as they extend toward the respective ends 30 and 32 of the spool body 24. It is to be understood that in the particular illustrated embodiment of the automatic fluid flow regulator 10 that the passages 26 and 28 that extend longitudinally along the periphery of the valve body 24 are shown to increase in size and volumetric capacity by increasing in depth but it would also be within the scope of the present invention for the passages to increase in volumetric capacity by increasing in width. Also, although a plurality of first and second grooves 26 and 28 have been shown, it would also be able to provide for a variable increase in volumetric capacity by only providing a single first groove 26 and a single second groove 28 if such grooves were suitably sized. The point is that the number and size of longitudinally grooves are a matter of choice so long as the variable increase of volumetric capacity is provided.

The hollow casing 12 is further provided with first and second spaced apart flow restriction means. In the illustrated embodiment of the invention these first and second flow restriction means take the form of first and second shoulders, 34 and 36, each having a predetermined width and extending inwardly to closely surround and slidably receive the spool body 24. The width of each shoulder 34 and 36 is chosen so as to cooperate with the valve body 24 and its longitudinally passages 26 and 28 and by partially covering the portion of each groove 26 and 28 to the flow of fluid into the casing 12 through the inlet port 14 to restrict the flow of fluid through the passages 26 and 28 and out the first and second outlet ports 16 and 18 into the separate branches of a fluid system.

It will be appreciated that the shoulders 34 and 36 could only partially encircle the valve body 24 and the spool body could be slidably received by a combination of the shoulders 36 and 38 and the casing 12 so long as the same flow restrictions were presented and the same principle of operation was maintained.

OPERATION

The operation of the unique automatic fluid flow regulator will now be described. When the fluid system is in equilibrium the pressure and volumetric flow rate of the fluid entering the inlet port 14 is represented by the symbols $P_o$ and $q_o$. The outlet pressure and the outlet volumetric flow rate at the first outlet port 16 and its associated branch are represented by the symbols $P_1$ and $q_1$. Similarly, the outlet pressure and the outlet volumetric flow rate at the second outlet port and its associated branch are represented by the symbols $P_2$ and $q_2$.

The pressure drop at the first and second flow constrictions 34 and 36 are represented by the symbols $P_1$ and $P_2$ and the symbols $V_1$ and $V_2$ represent the flow velocity at the flow restrictions 34 and 36. At equilibrium of the fluid system it will be seen that $q_1$ and $q_2$, $V_1 = V_2$ and consequently $P_1 = P_2$ and that $P_o - P_1 = P_o - P_2$ or $P_1 = P_2$. Should there be a disturbance in one of the branches downstream of the device 10, for example throttling of the flow in one or two of the fluid branches then the flow rates $q_1$ and $q_2$ and thus the velocities are no longer equal.

For example, $q_1 < q_2$ or $V_1 < V_2$. The pressure drop at the flow constriction of shoulder 34, $P_1$, will be smaller than the pressure drop $P_2$ at the flow constriction shoulder 36 thus $P_1 < P_2$ or $P_o - P_1 > P_o - P_2$. And since $P_1 = P_o - P_1$ and $P_2 = P_o - P_2$ then $P_1 > P_2$. Therefore, considering that the cross sectional area of each end 30 and 32 of the valve body is represented by the symbol F a force $(P_1 - p_2)F$ will act on the spool body 24 to move it away from the high pressure branch and toward the low pressure branch.

Thus, as the spool body 24 moves away from the high pressure side, the volumetric flow rate at side 1 will increase and the volumetric flow-rate at side 2 will decrease. The spool body 24 will continue to move in response to $(P_1 - P_2)F$ until the total flow resistance and the volumetric flow rate in each branch is at equilibrium.

The operation of the automatic fluid flow regulator 10 has been described on the basis of equal flow through both of the outlet ports 16 and 18 at equilibrium of the fluid system. However, by adjusting the flow areas through the flow restrictions 34 and 36, the volumetric flow rates at equilibrium through outlet ports 16 and 18 may be set to any desired predetermination ration. This could be accomplished, for example, by moving spaced shoulders 34 and/or 36 closer to the inlet port for decreased flow at equilibrium or, conversely, the shoulders 34 and/or 36 could be moved in a predetermined manner a further distance from the inlet port 14 for increased flow at equilibrium.

Thus, at equilibrium of the system with $q_1/q_2$ at a predetermined value, $V_1 = V_2$ and $P_2$ result in $P_1 = P_2$. Any disturbance in one of the branches connected to the outlet ports 16 and 18 will cause the spool body 24 to move in such a way as to restore equilibrium and the pre-set ratio of $q_1/q_2$.

If the fluid flow in one of the exit branches 16 or 18 of the regulator 10 increases, the spool body 24 will move to decrease this flow and to bring it back to its original set value. It would also be within the scope of the present invention, by proper selection of the dimensions of the regulator ports, to be possible to have the regulator 10 to completely block one of the exit ports 16 or 18 and thus interrupt all flow to the exit line that experiences a very large increase in flow. Thus, a broken exit line could automatically be shut off.

Regulating the fluid flow in one exit line will automatically adjust the flow in the other line thus restoring equilibrium. If the flow in one line 16 or 18 is completely blocked and the dimensions of the regulator 10 determined with this in mind then the fluid flow regulator will then automatically block the other exit and shut down the other line. Thus, it is possible with the regulator 10 of the present invention to regulate fluid flow in two lines by adjusting the flow rate in only one of the lines.

It has been illustrated how the automatic fluid flow regulator of the present invention reacts automatically to disturbances in one or both of separate branches of a fluid system to return it to equilibrium. It accomplishes this task without using sensors, springs, or elastomeric gaskets and the like, the use of any of which would be unacceptable in a cryogenic system.

Changes may be made in the combination and arrangement of parts or elements heretofore set forth in the specification and shown in the drawings, it being understood that changes may be made in the precise embodiment disclosed without departing from the spirit and scope of the invention as defined in the following claims.

I claim:

1. An automatic fluid flow regulator particularly adapted to split the flow of a fluid into the two separate branches and to maintain the ratio of such flows in a predetermined ratio and comprising:

a hollow regulator casing having an inlet port to provide fluid entry into the casing and first and second outlet ports, to provide exit of the fluid into two branches;

a solid cylindrical spool body slidably disposed within said casing, said spool body being provided at each end with longitudinally extending relieved portions that increase in size towards each end of the spool body;

first and second spaced apart flow restriction means each having a predetermined size and being positioned within the regulator casing and adapted to slidably receive the spool body whereby when a flow disturbance occurs within one branch or both branches so as to cause the flow rate or velocity of flow within one branch to be greater than the other then the pressure of the other branch will increase and exert a pressure against an end of the spool body causing it to slide within the regulator casing and expose a greater portion at that end of the spool body thereby permitting a greater fluid flow to that end of the spool body and to that particular branch until equilibrium is again reached for fluid flow through the regulator.

2. The automatic fluid flow regulator of claim 1 wherein the hollow regulator casing is provided with first outlet port at one end of the casing and a second outlet port at the opposing end of the casing.

3. The automatic fluid flow regulator of claim 2 wherein the hollow regulator casing is provided with an inlet port intermediate of the two ends of the casing so as to permit fluid entering the regulator casing through the inlet port to exit through the two outlet ports in two separate branches.

4. The automatic fluid flow regulator of claim 3 wherein the first and second flow restriction means are provided by first and second shoulder means which extend inwardly of the regulator casing to slidably receive the spool body.

5. The automatic fluid flow regulator of claim 4 wherein the first and second shoulder means of said flow restriction means have predetermined widths.

6. The automatic fluid flow regulator of claim 1 wherein the relieved portions in the spool body are provided by longitudinally extending channels formed in the outer periphery of the spool body, said channels having a depth that is at a minimum at a midpoint of the spool body and increase in depth as each channel extends toward an end of the spool body.

7. The automatic fluid flow regulator of claim 1 wherein the relieved portions of the spool body are provided by at least one channel extending longitudinally from a mid point of the spool body and increasing in size as each channel extends toward an end of the spool body.

8. The automatic fluid flow regulator of claim 1 wherein the first and second flow restrictions are provided by first and second shouldered means that extend at least part way around the inner portion of the valve casing so as to enable the spool body to be slidably supported within the valve casing.

9. The automatic fluid flow regulator of claim 4 wherein the first and second shoulder means of said flow restriction means are spaced predetermined distances from the inlet port of the casing so as to maintain equal flow of fluid through the two outlet ports.

10. The automatic fluid flow regulator of claim 4 wherein the first and second shoulder means of said flow restriction means are spaced predetermined distances from the inlet port of the casing so as to maintain flow through the two outlet ports in a predetermined ratio.

* * * * *